(12) United States Patent
Kim et al.

(10) Patent No.: US 7,946,747 B2
(45) Date of Patent: May 24, 2011

(54) BACKLIGHT UNIT

(75) Inventors: Jigon Kim, Gyeonggi-do (KR);
Jeongmin Moon, Gyeonggi-do (KR);
Gibin Kim, Gyeonggi-do (KR); Gilwon Han, Seoul (KR); Jigeun Nam, Seoul (KR); Chounsung Kang, Kyungnam (KR)

(73) Assignee: LG Display Co., Ltd., Seoul (KR)

( * ) Notice: Subject to any disclaimer, the term of this patent is extended or adjusted under 35 U.S.C. 154(b) by 236 days.

(21) Appl. No.: 12/314,963

(22) Filed: Dec. 19, 2008

(65) Prior Publication Data
US 2009/0213569 A1 Aug. 27, 2009

(30) Foreign Application Priority Data
Feb. 22, 2008 (KR) .................. 10-2008-0016494

(51) Int. Cl.
*F21V 7/04* (2006.01)
(52) U.S. Cl. ........ 362/628; 362/97.2; 362/299; 362/615
(58) Field of Classification Search ........ 362/97.1–97.2, 362/296.01, 297, 299, 327, 341, 346–347, 362/349, 560–561, 608–609, 628, 326, 615, 362/617, 621
See application file for complete search history.

(56) References Cited

U.S. PATENT DOCUMENTS
2004/0151007 A1* 8/2004 Chuang .................. 362/561
2007/0165420 A1* 7/2007 Weng et al. .................. 362/609

FOREIGN PATENT DOCUMENTS
CN 1296604 A 5/2001
CN 1488956 A 4/2004

* cited by examiner

*Primary Examiner* — Stephen F Husar
*Assistant Examiner* — Meghan K Dunwiddie
(74) *Attorney, Agent, or Firm* — Morgan, Lewis & Bockius LLP

(57) ABSTRACT

A backlight unit is disclosed. The backlight unit includes a light source unit generating light, a beam profile changer at the side of the light source unit, a reflective plate under the beam profile changer, and an optical film positioned on the beam profile changer and the reflective plate. The beam profile changer includes an incident surface facing the light source unit and an emitting surface positioned in a direction parallel to the incident surface. The reflective plate includes a first reflective surface having a first reflective area and a second reflective surface having a second reflective area. The second reflective surface is inclined from an end of the first reflective surface to an upward direction.

15 Claims, 3 Drawing Sheets

BACKLIGHT UNIT

This application claims priority from Korean Patent Application No. 10-2008-016494, filed on Feb. 22, 2008, the contents of which are incorporated herein by reference in its entirety.

BACKGROUND OF THE INVENTION

1. Field of the Invention

Exemplary embodiments of the invention relate to a backlight unit, and more particularly, to a backlight unit of which the weight is easy to decrease.

2. Description of the Related Art

Liquid crystal displays have been used in notebook personal computers, office automatic equipments, audio/video equipments, etc. because of advantages such as miniaturization, thin profile, and low power consumption.

The liquid crystal display includes a liquid crystal display module and a backlight unit. The backlight unit may be classified into an edge type backlight unit and a direct-under type backlight unit depending on a location of a light source.

The edge type backlight unit includes a light source unit, a light guide plate, a reflective plate, and an optical film.

The light source unit includes a light source such as at lest one cold cathode fluorescent lamp (CCFL) and at lest one external electrode fluorescent lamp (EEFL), and a light source reflective plate on which the light source is positioned.

The light source produces light having a predetermined wavelength, for example, white light. The light source reflective plate reflects the light produced by the light source.

The light guide plate is positioned at the side of the light source unit so as to obtain uniform light. The light guide plate allows the light coming from the light source unit to travel toward the liquid crystal display module.

The light guide plate is made of acrylic material having a critical angle of about 42° and a refractive index of about 1.5. The light guide plate is formed in a plate shape having an upper surface, a lower surface, and 4 sides.

Accordingly, in light passing through the side (i.e., an incident surface) of the light guide plate facing the light source unit, light having an azimuth angle smaller than the critical angle is emitted through the upper surface of the light guide plate, and light having an azimuth angle equal to or larger than the critical angle is totally reflected and diffused on the entire surface of the light guide plate.

The reflective plate is positioned on the lower surface of the light guide plate to reflect leakage light in an inside space of the light guide plate. The lower surface of the light guide plate may has a scattering pattern.

The optical film includes a diffuser sheet, a prism sheet, and a protective sheet. The diffuser sheet is positioned on the light guide plate and may include a lower diffuser sheet, a diffuser sheet support unit, and an upper diffuser sheet.

The diffuser sheet diffuses light traveling through the light guide plate using beads distributed in the diffuser sheet.

The prism sheet is positioned on the diffuser sheet and includes a base film and prisms. The prism sheet focuses the light diffused by the diffuser sheet.

The protective sheet diffuses the light focused by the prism sheet to provide the diffused light to the liquid crystal display module.

In addition to the above-described configuration of the optical film, the optical film may use combinations of various sheets in order to diffuse and focus the light traveling through the light guide plate.

In the edge-type backlight unit, the light guide plate is formed using an injection molding method or an extrusion molding method. In particular, the light guide plate is formed by forming a base using an injection molding method or an extrusion molding method and then forming a scattering pattern on a lower surface of the base through a curing process such as a thermal curing method. The weight of the light guide plate occupies most of the total weight of the edge-type backlight unit.

Accordingly, it is necessary to reduce a reduction in a thickness of the light guide plate in order to reduce the weight of the backlight unit and the weight of the liquid crystal display. However, it is limited to reduce the thickness of the light guide plate because of the light use efficiency. After all, the reduction in the weight of the backlight unit has been in the face of technical limitation.

SUMMARY OF THE INVENTION

Exemplary embodiments of the invention provide a backlight unit of which the weight is easy to decrease.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

In one aspect, a backlight unit comprises a light source unit generating light, a beam profile changer positioned at a side of the light source unit, the beam profile changer including an incident surface facing the light source unit and an emitting surface positioned in a direction parallel to the incident surface, a reflective plate positioned under the beam profile changer, the reflective plate including a first reflective surface having a first reflective area and a second reflective surface having a second reflective area, the second reflective surface being inclined from an end of the first reflective surface to an upward direction, and an optical film positioned on the beam profile changer and the reflective plate.

The beam profile changer extends along a longitudinal direction of the light source unit and has a wedge-shaped section in a width direction.

The beam profile changer includes an upper total reflection surface and a lower total reflection surface in which an angle between a first line extending from one edge of the incident surface and parallel to a center line of a thickness of the beam profile changer and a second line connecting the one edge of the incident surface to one edge of the emitting surface satisfies 4° to 20°. The upper total reflection surface and the lower total reflection surface are formed of a curved surface having a radius of curvature between 50 mm and 300 mm The radius of curvature of the upper total reflection surface and the lower total reflection surface increases or decreases in proportion to a thickness of the incident surface. The upper total reflection surface and the lower total reflection surface are symmetrical about the thickness center line of the beam profile changer in an up-and-down direction. Of course, the upper total reflection surface and the lower total reflection surface may be asymmetrical about the thickness center line in an up-and-down direction.

The emitting surface of the beam profile changer is formed of a plane surface perpendicular to the thickness center line of the beam profile changer, or is formed of a curved surface having a radius of curvature equal to or smaller than 100 mm.

In case the emitting surface is formed of the plane surface, the first reflective surface of the reflective plate is formed of a flat surface parallel to the thickness center line of the beam profile changer, or is formed of the same curved surface as the lower total reflection surface of the beam profile changer.

In case the emitting surface is formed of the curved surface having the radius of curvature equal to or smaller than 100 mm, the first reflective surface of the reflective plate is formed of a flat surface parallel to the thickness center line of the beam profile changer.

A size of the first reflective area increases or decreases in proportion to the thickness of the beam profile changer irrespective of a shape of the emitting surface. An inclined angle of the second reflective surface is determined so that an end of the second reflective surface is positioned within a range of the thickness of the beam profile changer.

In the backlight unit having the above-described configuration, because the beam profile changer can serve as a light guide plate, the backlight unit can obtain a uniform luminance without the light guide plate. Accordingly, the weight of the backlight unit can be significantly reduced.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EMBODIMENTS

Figure 1:
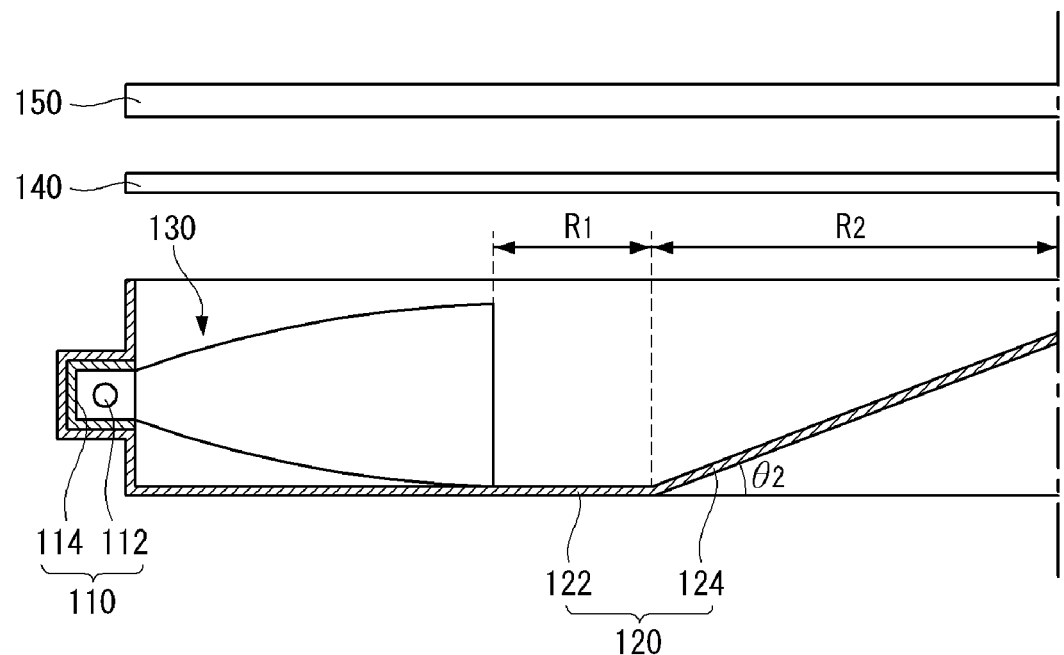
FIG. 1 is a cross-sectional view schematically showing a configuration of a liquid crystal display including an edge type backlight unit according to a first exemplary embodiment of the invention.

Hereinafter, exemplary embodiments of the invention will be described in detail with reference to the accompanying drawings so that this disclosure is thorough and complete and fully conveys the concept of the invention to those skilled in the art. This invention may, however, be embodied in many different forms and should not be construed as being limited to the embodiments set forth herein.

In the drawings, the thickness of layers and regions are exaggerated for clarity. To facilitate understanding, identical reference numerals have been used, where possible, to designate identical elements that are common to the figures. It will also be understood that when a layer is referred to as being "on" another layer or substrate, it can be directly on the other layer or substrate or intervening layers may also be present.

First Exemplary Embodiment

A liquid crystal display according to a first exemplary embodiment of the invention will be described in detail with reference to FIGS. 1 to 4.

Figure 2:
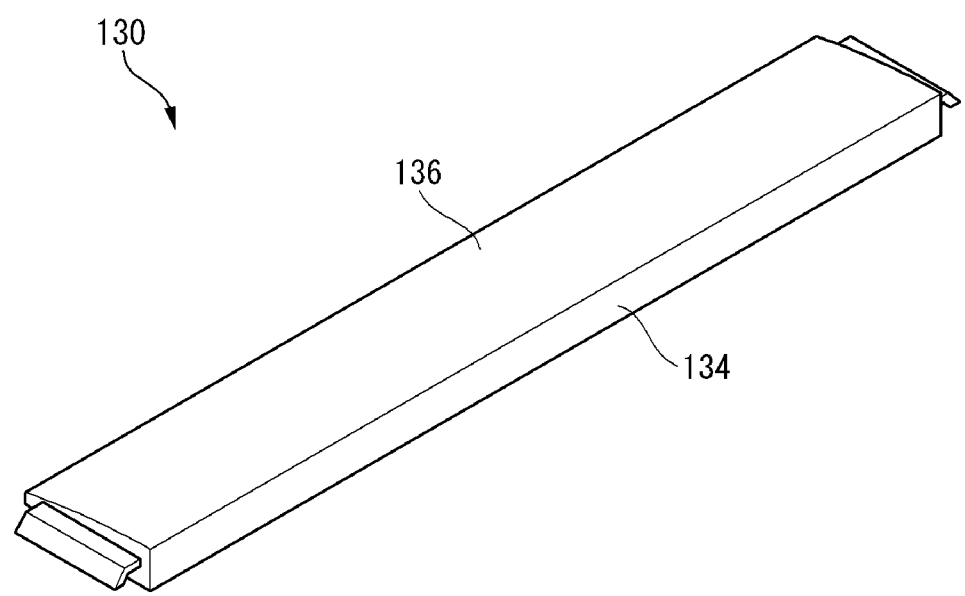
FIG. 2 is a prospective view of a beam profile changer used in the backlight unit.

FIG. 1 is a cross-sectional view schematically showing a configuration of a liquid crystal display including an edge type backlight unit according to the first exemplary embodiment of the invention, and FIG. 2 is a prospective view of a beam profile changer used in the backlight unit.

Figure 3:
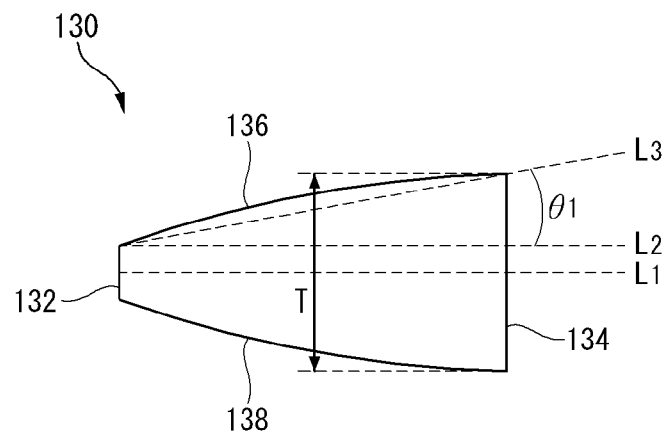
FIG. 3 is a concept diagram illustrating collimation and directionality of the beam profile changer.
Figure 4:
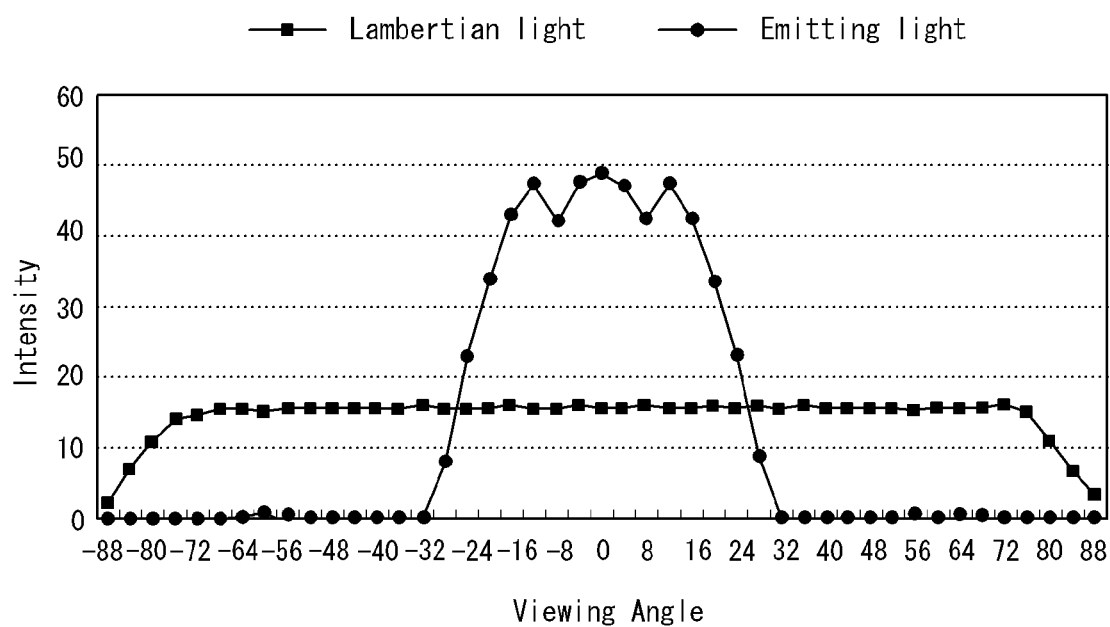
FIG. 4 is a graph illustrating collimation and directionality of the beam profile changer.

FIG. 3 is a concept diagram illustrating collimation and directionality of the beam profile changer, and FIG. 4 is a graph illustrating collimation and directionality of the beam profile changer.

The first exemplary embodiment describes an edge type backlight unit using a linear light source such as a cold cathode fluorescent lamp (CCFL) or an external electrode fluorescent lamp (EEFL), as an example. Of course, a point light source such as a light emitting diode (LED) may be used instead of the linear light source.

As shown in FIG. 1, the edge type backlight unit according to the first exemplary embodiment includes a light source unit 110.

The light source unit 110 includes a linear light source 112 producing light having a predetermined wavelength, for example, white light, and a light source reflective plate 114 reflecting the light produced by the linear light source 112.

The light source unit 110 is installed to be fixed at one end of a reflective plate 120 serving as a lower cover. Although FIG. 1 shows the case where one light source unit 110 is installed at one end of the reflective plate 120, the light source unit 110 may be installed at both ends of the reflective plate 120.

A beam profile changer 130 is installed at the side of the light source 112.

The beam profile changer 130 is made of polymethylmethacrylate (PMMA) having a refractive index of 1.49, extends along a longitudinal direction of the light source 112, and has a wedge-shaped section in a width direction perpendicular to the longitudinal direction. Of course, the beam profile changer 130 may be made of various materials in addition to polymethylmethacrylate (PMMA).

The beam profile changer 130 is installed in a portion of an inside space of the reflective plate 120. In the beam profile changer 130, an incident surface 132 facing the light source 112 and an emitting surface 134 emitting light passing through the incident surface 132 are positioned parallel to each other as shown in FIG. 3.

Mores specifically, although it is not shown, a separate fixing unit may be formed at an end of the beam profile changer 130 in a longitudinal direction of the beam profile changer 130 so as to align the incident surface 132 with the light source 112.

The beam profile changer 130 has an upper total reflection surface 136 and a lower total reflection surface 138 in addition to the incident surface 132 and the emitting surface 134. The upper total reflection surface 136 and the lower total reflection surface 138 adjust a total reflection angle of incident light passing through the incident surface 132 to collimate light emitted through the emitting surface 134.

For this, the upper total reflection surface 136 and the lower total reflection surface 138 are formed of a curved surface having a constant radius of curvature.

According to a result of an experiment conducted by inventors of the present application, it is preferable that the upper total reflection surface 136 and the lower total reflection surface 138 of the beam profile changer 130 are formed of a curved surface having a radius of curvature between 50 mm and 300 mm within a range where an angle θ1 between a line L2 parallel to a center line L1 of a thickness of the beam profile changer 130 and a line L3 connecting an end of the incident surface 132 to an end of the emitting surface 134 satisfies 4° to 20°, preferably 6° to 10°.

When the angle θ1 is out of the above range of 4° to 20°, a refractive index of light totally reflected from the upper total reflection surface 136 and the lower total reflection surface 138 decreases.

The radius of curvature of the upper total reflection surface 136 and the lower total reflection surface 138 increases or decreases in proportion to a thickness of the incident surface 132. According to the result of the experiment conducted by the inventors of the present application, when the thickness of the incident surface 132 is about 3 mm, it is preferable that the upper total reflection surface 136 and the lower total reflection surface 138 are formed of a curved surface having a radius of curvature of about 120 mm. When the thickness of the incident surface 132 exceeds 3 mm, it is preferable that the upper total reflection surface 136 and the lower total reflection surface 138 are formed of a curved surface having a radius of curvature of about 120 mm to 300 mm. When the thickness of the incident surface 132 is smaller than 3 mm, it is preferable that the upper total reflection surface 136 and the lower total reflection surface 138 are formed of a curved surface having a radius of curvature of about 50 mm to 120 mm.

In the first exemplary embodiment, the upper total reflection surface 136 and the lower total reflection surface 138 are symmetrical about the thickness center line L1 in an up-and-down direction, but they are not limited thereto. The upper total reflection surface 136 and the lower total reflection surface 138 may be asymmetrical about the thickness center line L1 in an up-and-down direction.

However, considering the ease of design and manufacture and the collimation and directionality of incident light, it is preferable that the upper total reflection surface 136 and the lower total reflection surface 138 are symmetrical about the thickness center line L1 in the up-and-down direction.

The light passing through the incident surface 132 is totally reflected from the upper total reflection surface 136 and the lower total reflection surface 138, and then is emitted through the emitting surface 134. The emitting surface 134 is formed of the same plane surface as the incident surface 132.

FIG. 4 is a graph showing a light intensity depending on a viewing angle. As shown in FIGS. 3 and 4, when lambertian light that is uniformly emitted at all angles is emitted through the emitting surface 134 of the beam profile changer 130, the emitted light has a high intensity at viewing angles of a predetermined range.

Accordingly, the beam profile changer 130 can efficiently collimate and travel the light generated in the light source.

The viewing angle is a viewing angle on the assumption that a position of a viewer's eye is on the thickness center line L1. It can be seen from FIG. 4 that the intensity of the light emitted through the emitting surface 134 of the beam profile changer 130 is high at viewing angles between about −20° and 20°.

In FIG. 4, positive angles indicate an upper portion of the thickness center line L1, and negative angles indicate a lower portion of the thickness center line L1. Accordingly, the light emitted from the beam profile changer 130 can be collimated and directed toward the upper portion and the lower portion of the thickness center line L1 at an angle of 20°, respectively.

The reflective plate 120 has a first reflective surface 122 and a second reflective surface 124. The first reflective surface 122 has a first reflective area R1, and the second reflective surface 124 has a second reflective area R2. The second reflective surface 124 is inclined from an end of the first reflective surface 122 to an upward direction at a constant angle.

The size of the first reflective area R1 increases or decreases in proportion to a thickness T of the beam profile changer 130. An inclined angle θ2 of the second reflective surface 124 is determined so that an end of the second reflective surface 124 is positioned within a range of the thickness T of the beam profile changer 130.

An additional pattern, such as a scattering pattern may be formed on the surface of the first reflective surface 122 and/or the second reflective surface 124 so as to improve reflective characteristics.

An optical film 140 is positioned on the beam profile changer 130 and the reflective plate 120, and a liquid crystal display module 150 is positioned on the optical film 140.

The optical film 140 may use combinations of various sheets such as a prism sheet, a diffuser sheet and a protective sheet.

In the liquid crystal display having the above-described configuration, the light generated in the light source 112 is collimated and directed by the beam profile changer 130, is reflected from the first reflective surface 122 and the second reflective surface 124 of the reflective plate 120, and travels toward the optical film 140. The light is diffused and focused by the optical film 140, thereby displaying an image on the liquid crystal display module 150.

In a drive of the liquid crystal display, the first reflective surface 122 reflects the light in only the first reflective area R1.

Second Exemplary Embodiment

Figure 5:
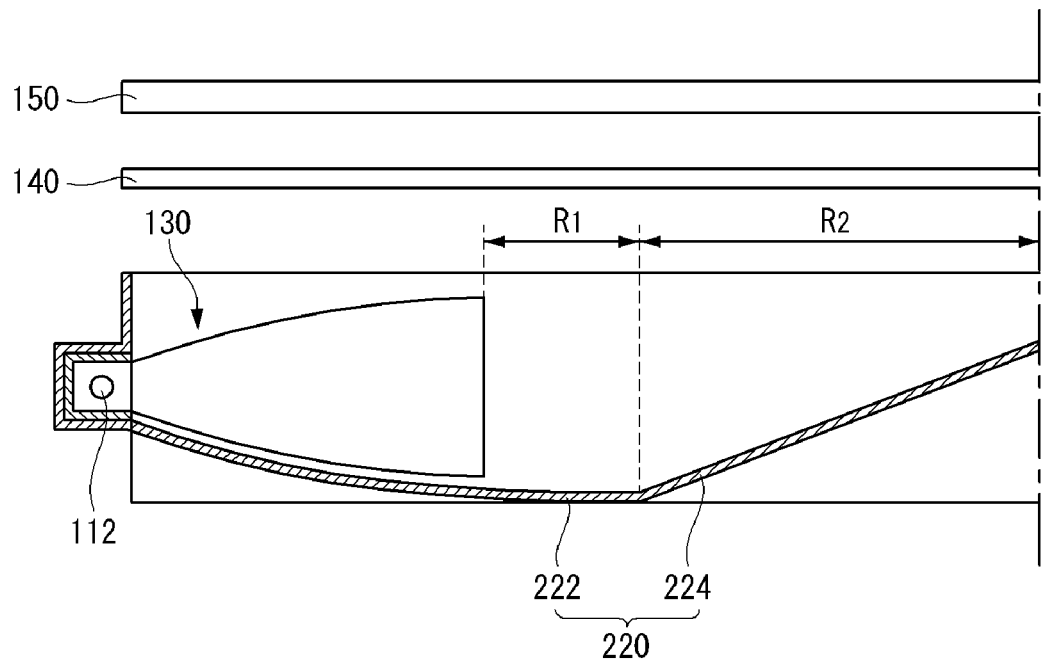
FIG. 5 is a cross-sectional view schematically showing a configuration of a liquid crystal display including an edge type backlight unit according to a second exemplary embodiment of the invention.

A second exemplary embodiment of the invention is below described with reference to FIG. 5. Since structures and components of the second exemplary embodiment are the same as those in the first exemplary embodiment except a reflective plate, the description thereabout is briefly made or is entirely omitted.

In the second exemplary embodiment, a first reflective surface 222 of a reflective plate 220 is formed of the same curved surface as a lower total reflection surface of a beam profile changer 130.

In the reflective plate 220 having the above-described structure, a uniform luminance can be obtained at both a first reflective area R1 of the first reflective surface 222 and a second reflective area R2 of a second reflective surface 224.

Third Exemplary Embodiment

Figure 6:
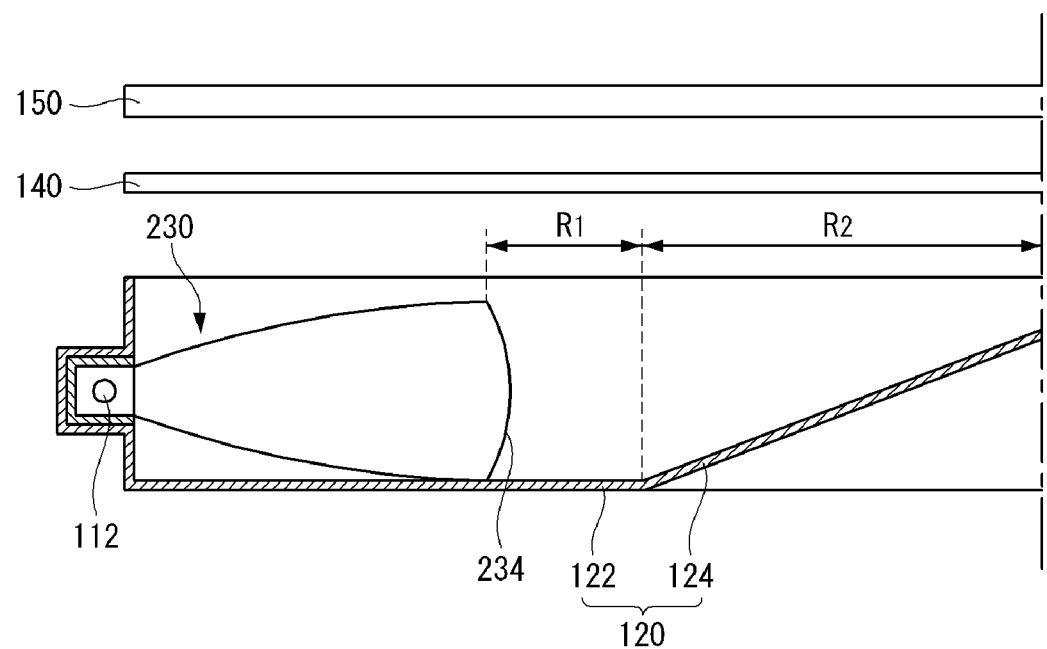
FIG. 6 is a cross-sectional view schematically showing a configuration of a liquid crystal display including an edge type backlight unit according to a third exemplary embodiment of the invention.

A third exemplary embodiment of the invention is below described with reference to FIG. 6. Since structures and components in the third exemplary embodiment are the same as those in the first exemplary embodiment except a beam profile changer, the description thereabout is briefly made or is entirely omitted.

In the third exemplary embodiment, a beam profile changer 230 includes an emitting surface 234 having a curved surface to adjust a traveling path of light emitted from the emitting surface 234. According to the result of the experiment conducted by the inventors of the present application, when the curved surface of the emitting surface 234 had a radius of curvature equal to or smaller than 100 mm, a uniform luminance could be obtained throughout the entire area.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A backlight unit comprising:
   a light source unit generating light;
   a beam profile changer positioned at a side of the light source unit, the beam profile changer including an incident surface facing the light source unit and an emitting surface positioned in a direction parallel to the incident surface, wherein the emitting surface has wider area than the incident surface;
   a reflective plate positioned under the beam profile changer, the reflective plate including a first reflective surface having a first reflective area and a second reflective surface having a second reflective area, the second reflective surface being inclined from an end of the first reflective surface in an upward direction; and
   an optical film positioned on the beam profile changer and the reflective plate.

2. The backlight unit of claim 1, wherein the beam profile changer extends along a longitudinal direction of the light source unit and has a wedge-shaped section in a width direction.

3. The backlight unit of claim 2, wherein the beam profile changer includes an upper total reflection surface and a lower total reflection surface in which an angle between a first line extending from one edge of the incident surface and parallel to a center line of a thickness of the beam profile changer and a second line connecting the one edge of the incident surface to one edge of the emitting surface satisfies 4° to 20°.

4. The backlight unit of claim 3, wherein the upper total reflection surface and the lower total reflection surface are formed of a curved surface having a radius of curvature between 50 mm and 300 mm.

5. The backlight unit of claim 4, wherein the radius of curvature of the upper total reflection surface and the lower total reflection surface increases or decreases in proportion to a thickness of the incident surface.

6. The backlight unit of claim 4, wherein the upper total reflection surface and the lower total reflection surface are symmetrical about the thickness center line of the beam profile changer in an up-and-down direction.

7. The backlight unit claim 1, wherein the emitting surface of the beam profile changer is formed of a plane surface perpendicular to the thickness center line of the beam profile changer.

8. The backlight unit of claim 7, wherein the first reflective surface of the reflective plate is formed of a flat surface parallel to the thickness center line of the beam profile changer.

9. The backlight unit of claim 7, wherein the first reflective surface of the reflective plate is formed of the same curved surface as the lower total reflection surface of the beam profile changer.

10. The backlight unit of claim 7, wherein a size of the first reflective area increases or decreases in proportion to the thickness of the beam profile changer.

11. The backlight unit of claim 7, wherein an inclined angle of the second reflective surface is determined so that an end of the second reflective surface is positioned within a range of the thickness of the beam profile changer.

12. The backlight unit claim 1, wherein the emitting surface of the beam profile changer is formed of a curved surface having a radius of curvature equal to or smaller than 100 mm.

13. The backlight unit of claim 12, wherein the first reflective surface of the reflective plate is formed of a flat surface parallel to the thickness center line of the beam profile changer.

14. The backlight unit of claim 13, wherein a size of the first reflective area increases or decreases in proportion to the thickness of the beam profile changer.

15. The backlight unit of claim 13, wherein an inclined angle of the second reflective surface is determined so that an end of the second reflective surface is positioned within a range of the thickness of the beam profile changer.

* * * * *